UNITED STATES PATENT OFFICE.

JOSEPH T. THOMPSON, OF HATTON, NORTH DAKOTA.

COMPOSITION FOR STOPPING LEAKS.

1,070,857. Specification of Letters Patent. Patented Aug. 19, 1913.

No Drawing. Application filed February 13, 1912. Serial No. 677,306.

*To all whom it may concern:*

Be it known that I, JOSEPH T. THOMPSON, a citizen of the United States, residing at Hatton, in the county of Traill and State of North Dakota, have invented new and useful Improvements in Compositions for Stopping Leaks, of which the following is a specification.

This invention relates to certain novel and useful improvements in a compound adapted to be employed in repairing and mounting metallic articles or structures, such as boilers, cylinders, automobile radiators and joints, and couplings of various kinds.

In carrying out my invention, it is my purpose to provide a compound which is adapted to be thrown or mixed with the water contained in the receptacle, such as a boiler or the like for the purpose of stopping any leaks in the latter.

Still a further object of the invention is the provision of a compound which may be readily and quickly prepared for use and which may be made at a relatively low cost.

My invention consists in the improved compound set forth in and falling within the scope of the appended claim.

In one embodiment of my invention, I form my repairing compound of—

| | |
|---|---|
| Lamp black | 5.82% |
| Ground linseed | 46.60% |
| Wood ashes | 7.77% |
| Flour | 15.53% |
| Oat meal | 23.31% |
| Camphor | .97% |

The various ingredients of my compound are thoroughly mixed so that they form a powder which, as above-stated, is mixed with the water in the receptacle, and will act to stop any leaks, cracks or breaks in such receptacle.

The action of the various ingredients, upon one another in stopping a leak is, according to my understanding, as follows, although it is not asserted that other or different peculiarities may not be present; the compound of which the ingredients above specified form the component parts, will seek the opening or fracture with the current of water. The flour and oatmeal form a doughy substance which collects and retains the other ingredients of the compound, the flour filling in and making the oatmeal more compact in its expansion, while the camphor imparts to the oatmeal and flour elasticity and when heated unites with the linseed, lamp black and wood ashes in such manner that a hard substance is formed that fills the opening or fracture and stops the leak. The wood ashes, so far as I have been able to determine is the principal hardening element in the composition and forms, in connection with the other ingredients, a glazed hard coating which adheres to the fracture after the fashion of solder. The linseed in conjunction with the lamp black produces an adhesive substance for the ashes and camphor in the hardening process.

I claim:—

The herein described composition comprising lamp black, 5.82%, ground linseed, 46.60%, wood ashes, 7.77%, flour, 15.53%, oat meal, 23.31%, and camphor, .97%.

In testimony whereof I affix my signature in presence of two witnesses.

JOE. T. THOMPSON.

Witnesses:
T. R. ROBINSON,
SAM. SPANGELAND.